(12) United States Patent
Lee

(10) Patent No.: US 9,311,166 B2
(45) Date of Patent: Apr. 12, 2016

(54) REMOTE USER INTERFACE PROXY APPARATUS AND METHOD OF PROCESSING USER INTERFACE COMPONENTS THEREOF

(75) Inventor: Joo-yeol Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 12/389,698

(22) Filed: Feb. 20, 2009

(65) Prior Publication Data

US 2009/0210488 A1 Aug. 20, 2009

(30) Foreign Application Priority Data

Feb. 20, 2008 (KR) ........................ 10-2008-0015443

(51) Int. Cl.
*G06F 15/16* (2006.01)
*G06F 9/54* (2006.01)
*H04L 29/08* (2006.01)

(52) U.S. Cl.
CPC .............. *G06F 9/54* (2013.01); *H04L 67/2804* (2013.01); *H04L 67/2819* (2013.01); *H04L 67/2861* (2013.01)

(58) Field of Classification Search
CPC .................... H04L 67/2804; H04L 67/22861; H04L 67/2819
USPC ................................................. 709/217, 219
See application file for complete search history.

(56) References Cited

U.S. PATENT DOCUMENTS

| | | | |
|---|---|---|---|
| 6,751,623 B1* | 6/2004 | Basso et al. | |
| 6,963,925 B1 | 11/2005 | Ishikawa et al. | |
| 7,743,042 B2 | 6/2010 | Kim | |
| 8,230,004 B2 | 7/2012 | Igarashi | |
| 2001/0033554 A1* | 10/2001 | Ayyagari et al. | 370/328 |
| 2002/0029256 A1* | 3/2002 | Zintel et al. | 709/218 |
| 2002/0188726 A1 | 12/2002 | Schick et al. | |
| 2004/0242209 A1* | 12/2004 | Kruis et al. | 455/414.1 |
| 2006/0159110 A1* | 7/2006 | Choi et al. | 370/401 |
| 2006/0161946 A1* | 7/2006 | Shin | 725/33 |

(Continued)

FOREIGN PATENT DOCUMENTS

| | | |
|---|---|---|
| CN | 1879355 A | 12/2006 |
| CN | 101026598 A | 8/2007 |

(Continued)

OTHER PUBLICATIONS

Fielding et al, RFC 2616 "Hypertext Transfer Protocol—HTTP/1.1", 1999, p. 135.*

(Continued)

*Primary Examiner* — Karen Tang
(74) *Attorney, Agent, or Firm* — Sughrue Mion, PLLC

(57) ABSTRACT

Provided is a proxy apparatus having an embedded remote user interface client (RUIC) and an embedded remote user interface server (RUIS) that transmits a UI component received from an external RUIS or session information of the UI component to an external RUIC. Thus, a user can use contents of a remote user interface server (RUIS) with a new RUIC while maintaining a session state between the external RUIS and an existing RUIC. Since the UI components, prohibited from being forwarded by the external RUIS, are not forwarded to the new RUIC, the contents policy, which corresponds with the business needs of contents providers, can be ensured.

14 Claims, 7 Drawing Sheets

(56) References Cited

U.S. PATENT DOCUMENTS

| | | | |
|---|---|---|---|
| 2006/0174026 A1* | 8/2006 | Robinson et al. | 709/231 |
| 2006/0230159 A1 | 10/2006 | Jones et al. | |
| 2006/0245403 A1* | 11/2006 | Kumar | 370/338 |
| 2007/0038823 A1 | 2/2007 | Banks | |
| 2007/0064124 A1* | 3/2007 | Kirani et al. | 348/234 |
| 2007/0073730 A1 | 3/2007 | Jun | |
| 2007/0156894 A1* | 7/2007 | Dees | 709/225 |
| 2007/0174297 A1 | 7/2007 | Kim | |
| 2008/0040351 A1 | 2/2008 | Jin et al. | |
| 2008/0108437 A1* | 5/2008 | Kaarela et al. | 463/42 |
| 2009/0100147 A1* | 4/2009 | Igarashi | 709/218 |
| 2009/0180484 A1* | 7/2009 | Igarashi | 370/401 |
| 2009/0210488 A1* | 8/2009 | Lee | 709/203 |
| 2009/0304009 A1* | 12/2009 | Kolhi et al. | 370/400 |

FOREIGN PATENT DOCUMENTS

| | | | |
|---|---|---|---|
| EP | 1865687 A1 | | 12/2007 |
| JP | 20017861 A | | 1/2001 |
| JP | 2001175747 | | 6/2001 |
| JP | 2003296360 A | | 10/2003 |
| JP | 2004533074 A | | 10/2004 |
| JP | 2006146648 A | | 6/2006 |
| JP | 2007272868 A | | 10/2007 |
| KR | 1020040074489 A | | 8/2004 |
| KR | 1020060069515 | | 6/2006 |
| KR | 1020060118221 A | | 11/2006 |
| KR | 1020070065501 A | | 6/2007 |
| NL | EP1865687 | * | 6/2006 |
| WO | 00/33208 A2 | | 6/2000 |
| WO | 2007105568 A1 | | 9/2007 |

OTHER PUBLICATIONS

Communication dated Oct. 10, 2012 from the State Intellectual Property Office of P.R. China in counterpart Chinese application No. 200980105901.4.

Communication dated Sep. 11, 2012 from the Japanese Patent Office in counterpart Japanese application No. 2010-547562.

Communication dated Feb. 26, 2013 from the Japanese Patent Office in counterpart Japanese application No. 2010-547562.

Communication dated Apr. 15, 2013 from the State Intellectual Property Office of P.R. China in counterpart Chinese application No. 200980105901.4.

Communication dated Dec. 30, 2011 from the European Patent Office in counterpart European application No. 09712466.3.

Communication dated Nov. 28, 2013, issued by the State Intellectual Property Office of the People's Republic of China in counterpart Chinese Application No. 200980105901.4.

J. Rosenberg, A Framework for Application Interaction in the Session Initiation Protocol (SIP), Cisco Systems, Jul. 18, 2005, 26 pages.

UPnP Device Architecture 1.0, Dec. 2, 2003, 76 pages.

Consumer Electronics Association, Web-based Protocol and Framework for Remote User Interface on UPnP™ Networks and the Internet (Web4CE), Jul. 2007, 176 pages; CEA-2014-A.

Consumer Electronics Association, Web-based Protocol and Framework for Remote User Interface on UPnP™ Networks and the Internet (Web4CE), Sep. 2010, 336 pages; CEA-2014-B.

Communication, dated Jun. 11, 2014, issued by the Chinese Patent and Trade Mark Office in counterpart Patent Application No. 200980105901.4.

Communication, Issued by the Korean Intellectual Property Office, Dated Oct. 7, 2014, In counterpart Korean Application No. 10-2008-0015443.

Walker, Mark R., "CEA 2014 Overview", ATIS ITU-T FG IPTV Interoperability Forum, Jan. 24, 2007, 10 pages.

Communication dated Feb. 24, 2014 issued by the Korean State Intellectual Property Office in counterpart Korean Patent Application No. 10-2008-0015443.

* cited by examiner

REMOTE USER INTERFACE PROXY APPARATUS AND METHOD OF PROCESSING USER INTERFACE COMPONENTS THEREOF

CROSS-REFERENCE TO RELATED PATENT APPLICATION

This application claims the priority of Korean Patent Application No. 10-2008-0015443, filed on Feb. 20, 2008, in the Korean Intellectual Property Office, the disclosure of which is incorporated herein in its entirety by reference.

BACKGROUND OF THE INVENTION

1. Field of the Invention

Apparatuses and methods consistent with the present invention relate to a remote user interface (RUI), and more particularly, to a method of processing user interface (UI) components of an RUI client in session with an RUI server.

2. Description of the Related Art

A remote user interface (RUI) is a mechanism for rendering and controlling a user interface to control applications on a device other than the device driving the applications. Various RUI techniques such as the consumer electronics association (CEA) standard CEA-2014, an extended home theater (XHT), a widget description exchange service (WiDeX), and a remote desktop protocol (RDP) have been researched. In the RUI techniques, an RUI client (hereinafter, referred to as RUIC) sets up a session with an RUI server (hereinafter, referred to as RUIS), and receives UI components from the RUIS, so that the RUIC can control the RUIS. Here, the UI components denote sub-elements constituting the UI. The UI components collectively refer to data having any formats such as icons, pull-down menus, buttons, scroll bars, windows, texts, and A/V data (audio, video, and picture data etc.), which are provided from the RUIS to the RUIC in an RUI session.

In addition, in the RUI techniques, a user can easily use contents of the RUIS as local contents. However, a method capable of changing an RUIC with seamless session continuity has not been disclosed.

That is, in the RUI techniques, since the RUIC communicates with the RUIS in a one-to-one (1:1) session which is set up between the RUIC and the RUIS, the user cannot use the current session in other RUICs. For example, when the user watches a movie of a DVD player as the RUIS and uses a PC as the RUIC, the user might desire to change the RUIC from the PC to a personal digital assistant (PDA). In this case, the user needs to restart by setting up the session using the PDA. Therefore, the user cannot change the RUIC in a seamless form.

SUMMARY OF THE INVENTION

The present invention provides a method and apparatus for changing a remote user interface (RUI) client from a current RUI client in session with a remote user interface server (RUIS), while maintaining an existing session state.

According to an aspect of the present invention, there is provided a method of communicating of an RUIC (remote user interface client) apparatus in session with an external RUIS (remote user interface server), the method including searching for an external RUIC corresponding to an RUIS embedded within the RUIC apparatus; and transmitting a UI (user interface) component received from the external RUIS or session information of the UI component to the external RUIC.

In the transmitting, the UI component or the session information may be transmitted only if the UI component is determined to be forwardable according to information included in the UI component.

The searching may be performed in accordance with the CEA-2014 (customer electronics association 2014) standard, and the transmitting may include changing the UI component into an optimized format for the external RUIC, with reference to a UPnP (universal plug and play) device description of the external RUIC device in which the external RUIC is embedded; and transmitting the changed UI component to the external RUIC via an RUI session.

The searching may be performed in accordance with the CEA-2014 standard, and, in the transmitting, the UI component or the session information may be transmitted only if the external RUIC is determined to be able to process the UI component according to the UPnP device description of the external RUIC device in which the external RUIC is embedded.

The UI component may be described using a CE-HTML, and the information may be expressed with a tag of the CE-HTML.

According to another aspect of the present invention, there is provided a computer readable medium having embodied thereon a computer program for the above method.

According to another aspect of the present invention, there is provided an RUIC apparatus including a searching unit searching for an external RUIC corresponding to an RUIS embedded within the RUIC apparatus; and a UI component transmitting a UI (user interface) component received from the external RUIS or session information of the UI component to the external RUIC.

According to another aspect of the present invention, there is provided a method for an RUIS to communicate with an RUIC, the method including inserting information indicating whether or not a UI component is forwardable in the UI component; and transmitting the UI component in which the information is inserted, to the RUIC.

According to another aspect of the present invention, there is provided an RUIS apparatus including an inserting unit inserting information indicating whether or not a UI component is forwardable in the UI component; and a transmitting unit transmitting the UI component in which the information is inserted, to the RUIC.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
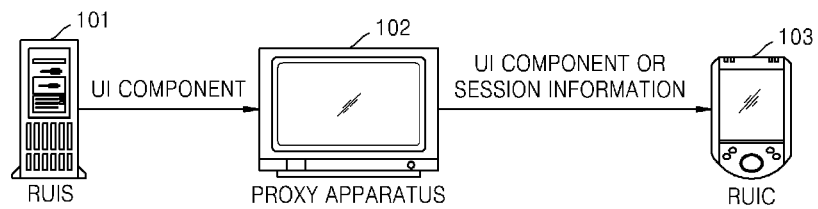
FIG. 1 is a diagram illustrating a basic concept of the present invention.

FIG. 1 is a diagram illustrating a basic concept of the present invention.

The present invention provides a proxy apparatus 102 that includes both a remote user interface server (RUIS) and a remote user interface client (RUIC). This proxy apparatus 102 operates as an RUIC for the RUIS 101 and as an RUIS for the RUIC 103. In the present invention, the RUIS and the RUIC provided by the proxy apparatus 102 are referred to as an embedded RUIS and an embedded RUIC, respectively. The RUIS 101 and the RUIC 103 are hereinafter referred to as an external RUIS 101 and an external RUIC 103, respectively.

The proxy apparatus 102 sends a UI component received from the external RUIS 101 or session information of the external RUIS 101. Therefore, an RUIC can be changed from the proxy apparatus 102 to the external RUIC 103, while maintaining an existing session state set up between the external RUIS 101 and the proxy apparatus 102. More specifically, since the external RUIC 103 is not an RUIC for the external RUIS 101 but an RUIC for the embedded RUIS, an RUI protocol between the embedded RUIC and the external RUIS 101 may be different from an RUI protocol between the embedded RUIS and the external RUIC 103. For example, the CEA-2014 standard can be used between the embedded RUIC and the external RUIS 101, and a remote desktop protocol (RDP) can be used between the embedded RUIS and the external RUIC 103.

However, when the proxy apparatus 102 forwards the received UI component to the external RUIC 103, contents provided from the external RUIS 101 may be distributed in an unlimited manner that is contrary to the business policy of the contents provider. Furthermore, when device capabilities of the proxy apparatus 102 and the external RUIC 103 are different from each other, the external RUIC 103 may not normally process the UI component of the external RUIS 101. Therefore, the UI component received from the external RUIS 101 needs to be processed before the proxy apparatus 102 transmits the UI component to the external RUIC. Hereinafter, the description thereof will be made in detail.

Figure 2:
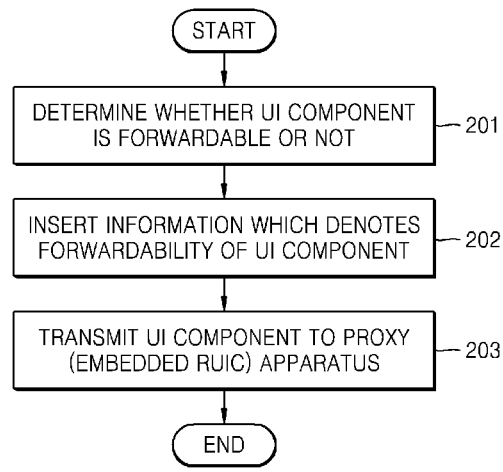
FIG. 2 is a flowchart of a processing operation of a user interface (UI) component of a remote user interface server (RUIS) according to an embodiment of the present invention.

FIG. 2 is a flowchart of a processing of a UI component of the external RUIS, according to an embodiment of the present invention.

In operation 201, the external RUIS determines whether or not to forward the UI component to be transmitted to the proxy apparatus. Generally, a provider of contents corresponding to the UI component determines whether or not to forward the UI component. In the present invention, a scheme of notifying a forwarding possibility of the contents is not limited.

In operation 202, the external RUIS inserts forwarding information indicating whether the UI component is forwardable to the UI component or not. The forwarding information may be inserted only in the UI components which are forwardable. Alternatively, the forwarding information may be inserted only in the UI components which are not forwardable. Also, the forwarding information may be inserted in all UI components.

For example, in the CEA-2014 standard describing the UI component using a CE-HTML, this forwarding information may be expressed with a tag.

In operation 203, the external RUIS sends the UI component in which the forwarding information is inserted, to the proxy apparatus, that is, the embedded RUIC.

Figure 3:
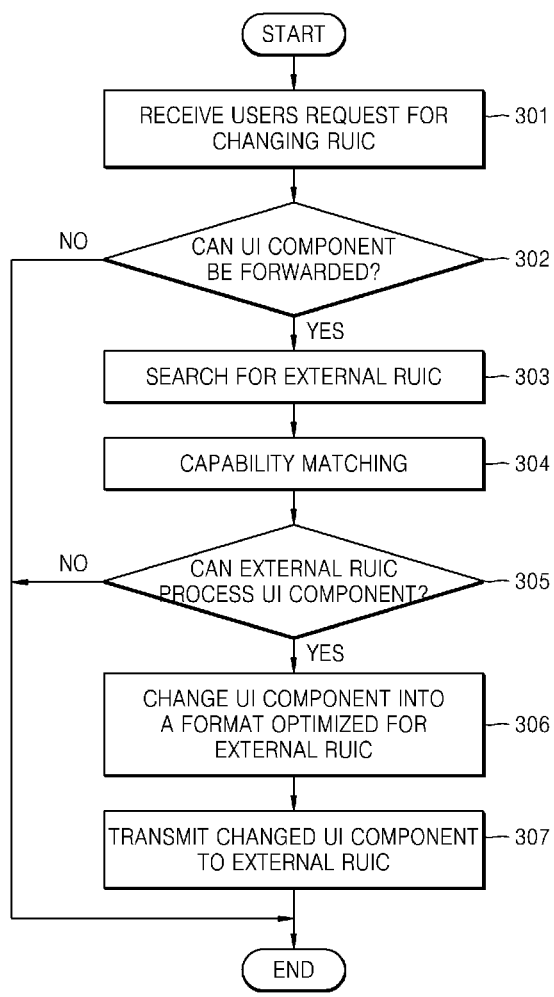
FIG. 3 is a flowchart of a forwarding operation of a UI component of a proxy apparatus to a remote user interface client (RUIC), according to an embodiment of the present invention.

FIG. 3 is a flowchart of a forwarding of the UI component of the proxy apparatus to the RUIC, according to an embodiment of the present invention.

In operation 301, the proxy apparatus, which is set up in an RUI session with the external RUIS, receives users request for changing the RUIC.

In operation 302, the proxy apparatus determines whether or not the UI component received (or being received) in a current session is forwarded. The determination is performed based on the forwarding information described with reference to FIG. 2.

In operation 303, if the UI component can be forwarded, the proxy apparatus searches the external RUIC apparatus. The proxy apparatus may search the external RUIC apparatus according to a variety of RUI standards. For example, in the CEA-2014 standard, the external RUIC apparatus is searched using the DISCOVERY procedure of the UPnP.

In operation 304, the proxy apparatus performs a capability matching procedure with the external RUIC apparatus, assuming that the proxy apparatus searches the external RUIC apparatus performing in accordance with the CEA-2014 standard. The embedded RUIS of the proxy apparatus exchanges information regarding the capability through the capability matching procedure. For example, according to the CEA-2014 standard, if there is a tag <rui:uiListURL> of a device description of an RUIS, a profile of the RUIC (a set of parameters for device capability) is described in a document of a UI list. On the other hand, the profile of the RUIC is directly described in the device description <rui:profilelist>. Since the details of the capability matching are described in the CEA-2014 standard, the description thereof will be omitted.

In operation 305, the proxy apparatus determines whether or not the external RUIC can process the UI component. For example, the proxy apparatus determines whether or not the external RUIC is provided with an appropriate video codec for processing the UI component. In the embodiment, if the external RUIC cannot process the UI component, it is assumed that the forwarding procedure of the UI component is terminated. However, in other embodiments, the proxy apparatus may have a decoder and encoder for changing a format of the UI component, so that the external RUIC can process the UI component.

In operation 306, the proxy apparatus changes the UI component into a UI component having a format optimized for the external RUIC. That is, a layout, a size, and the like of the UI component are appropriately changed according to the capability of the external RUIC. The optimization need not necessarily be an absolute optimization. However, the UI component may be changed according to a rule of a UI developer in advance.

In operation 307, the proxy apparatus transmits the changed UI component to the external RUIC.

Figure 4:
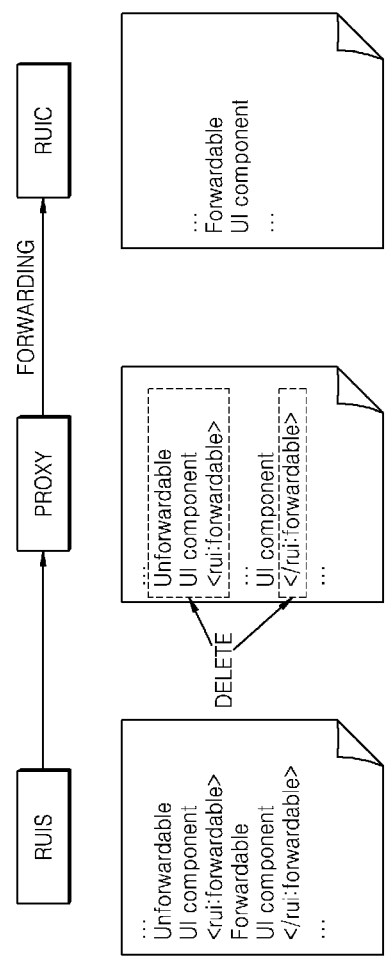
FIG. 4 is a diagram illustrating a proxy apparatus selectively forwarding a UI component, according to an embodiment of the present invention.

FIG. 4 is a diagram illustrating an embodiment of the proxy apparatus selectively forwarding a UI component, according to an embodiment of the present invention.

In the CE-HTML as shown in FIG. 4, the external RUIS inserts a tag <rui:forwardable> only to the UI component, from among the UI components, which can be forwarded, so that the UI component is transmitted to the proxy apparatus.

In the CE-HTML, the proxy apparatus deletes all the UI components which cannot be forwarded. The proxy apparatus transmits only the UI components which can be forwarded to the external RUIC. If the external RUIC is a conventional RUIC, the tag <rui:forwardable> cannot be interpreted, and thus the proxy apparatus deletes the tag <rui:forwardable>.

The external RUIC that receives the CE-HTML generated by the proxy apparatus displays only the UI components which can be forwarded.

Figure 5:
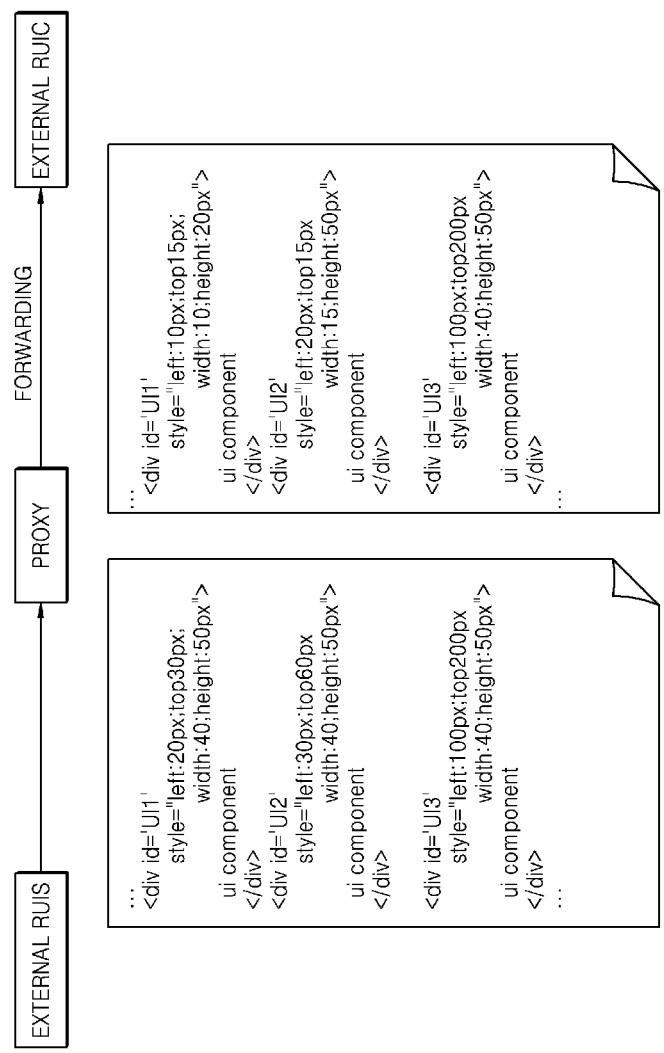
FIG. 5 is a diagram illustrating a forwarding operation of a UI component changed by a proxy apparatus, according to an embodiment of the present invention.

FIG. 5 is a diagram illustrating a forwarding operation of a UI component changed by a proxy apparatus, according to an embodiment of the present invention.

As shown in FIG. 5, three UI components UI1, UI2, and UI3 are included in the CE-HTML which is transmitted from the external RUIS to the proxy apparatus.

Referring to FIG. 5, the proxy apparatus changes the layout and the size of the UI components UI and UI2 according to a device capability of the external RUIC, but the UI component UI3 is not changed. As described above, a scheme for which the proxy apparatus checks a device capability of the external RUIS may be varied according to the RUI standard with which the embedded RUIS of the proxy apparatus and the external RUIC performed in accordance. For example, the proxy apparatus in the CEA-2014 standard refers an UPnP device description of the external RUIC apparatus.

Figure 6:
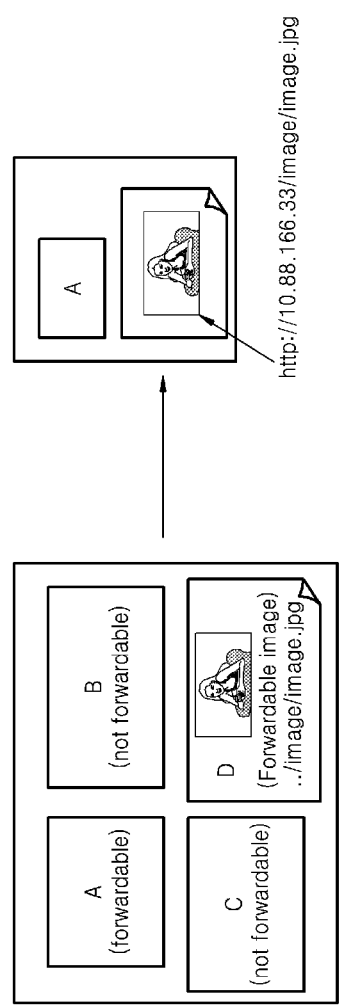
FIG. 6 is a diagram illustrating a UI component changed by a proxy apparatus, according to an embodiment of the present invention.

FIG. 6 is a diagram illustrating a UI component changed by a proxy apparatus, according to an embodiment of the present invention.

In FIG. 6, a UI page in the left portion of the diagram illustrates a page that the proxy apparatus receives from the external RUIS, and a UI page in the right portion of the diagram illustrates a page that the proxy apparatus generates to transmit the page to the external RUIC. As shown in FIG. 6, four UI components A, B, C, and D are included in the UI page which the proxy apparatus receives from the external RUIS. When the UI components A and D can be forwarded, the proxy apparatus generates the UI page by using only the UI components A and D.

In this case, a size and a layout of the UI components A and D are changed into a size and a layout which are optimized for the external RUIC. Furthermore, in the embodiment, a resource path of the UI component D is changed from a relative path to an absolute path by the proxy apparatus. However, if the proxy apparatus downloads "image.jpg" and if the proxy apparatus generates a directory so that an internal path of "image.jpg" in the proxy apparatus is identical to an internal path in the external RUIS, the changing of the resource path from the relative path to the absolute path may be omitted.

Figure 7:
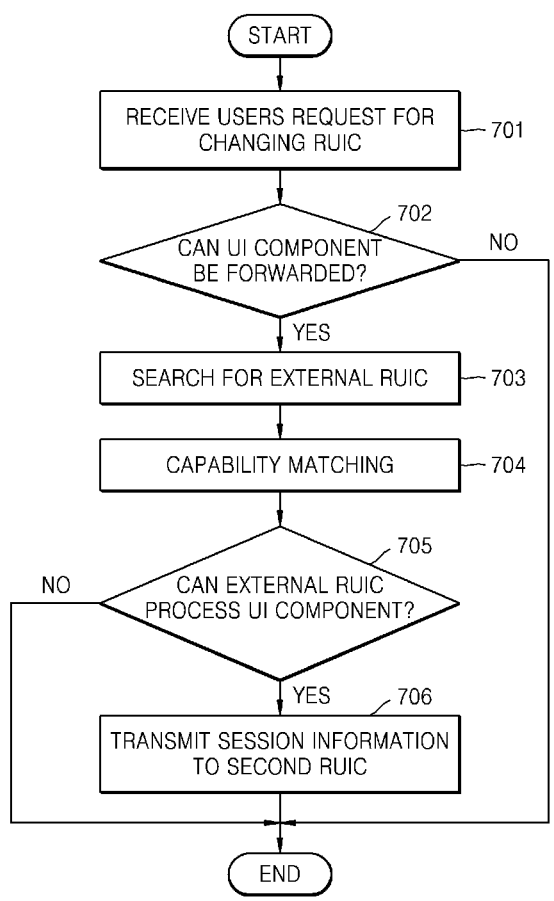
FIG. 7 is a flowchart of a transmitting operation of session information to an external RUIC of a proxy apparatus, according to an embodiment of the present invention.

FIG. 7 is a flowchart of a transmitting of session information to an external RUIC of a proxy apparatus, according to an embodiment of the present invention.

As described above, the proxy apparatus can forward the UI component or the session information of the UI component to the external RUIC. The external RUIC can use the external RUIS contents while maintaining an existing session state by receiving the session information.

Since the details of operations 701 to 705 are identical to operations 301 to 305 in FIG. 3, the descriptions thereof will be omitted However, unlike in FIG. 3, the proxy apparatus of the present embodiment does not forward the UI component, but transmits the session information of the UI component to a final RUIC, in operation 706.

The session information includes various types of information which denotes the session state set up between the embedded RUIC of the proxy apparatus and the external RUIS due to restoring the session state between the embedded RUIC of the proxy apparatus and the external RUIS by using this session information.

That is, the session information may include information such as a URL of a current UI page, information regarding cookies, a time of date when a current UI page is stored to the embedded RUIC, a user name, and a password. According to the CEA-2014 standard, the session information, such as FriendlyNameForStoredStates, URLToBeSaved, MetadataForUI, CookiesToBeSaved, UserName, and DateTimeWhenSaved, are exemplified.

Figure 8:
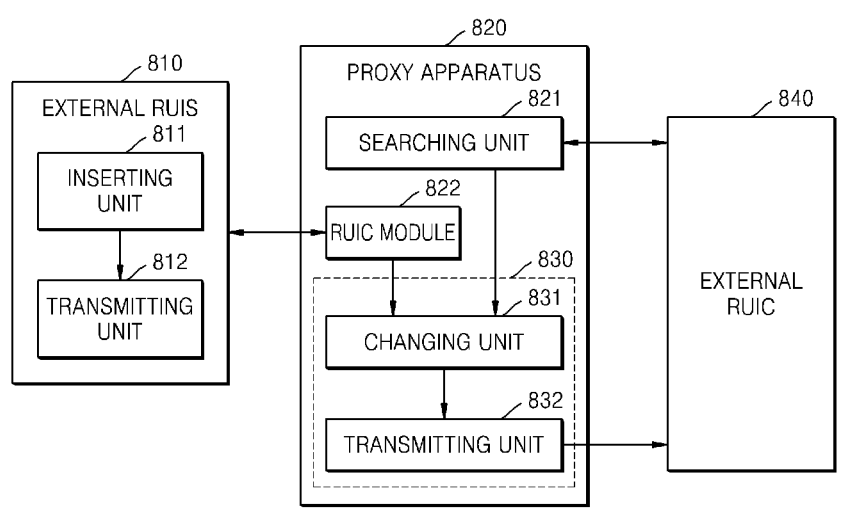
FIG. 8 is a diagram illustrating configurations of a proxy apparatus and an RUIS apparatus, according to an embodiment of the present invention.

FIG. 8 is a block diagram of a structure of a proxy apparatus 820 and a external RUIS apparatus 810, according to an embodiment of the present invention. It is assumed that the proxy apparatus 820 and an external RUIC 840 perform in accordance with the CEA-2014 standard.

As shown in FIG. 8, the external RUIS apparatus 810 includes an inserting unit 811 and a transmitting unit 812. The inserting unit 811 inserts forwarding information regarding whether or not to forward the UI component, to the UI component. The transmitting unit 812 transmits the UI component in which the forwarding information is inserted, to the proxy apparatus 820.

The proxy apparatus 820 includes a searching unit 821, an RUIC module 822, and a UI component transmitting unit 830. The searching unit 821 performs a DISCOVERY procedure of UPnP according to the CEA-2014 standard. In addition, the searching unit 821 performs a capability matching procedure with respect to the external RUIC apparatus 840.

The RUIC module 822 performs functions of the RUIC, which correspond to the external RUIS 810, and receives the UI component from the external RUIS 810.

The UI component transmitting unit 830 transmits the UI component or the information regarding the UI component, which is received from the external RUIS 810, to the external RUIC 840. The UI component transmitting unit 830 may transmit the UI component or the session information to the external RUIC 810 only if the UI component can be forwarded. As described above, it is determined whether or not the UI component can be forwarded by referring to the forwarding information inserted in the UI component. The forwarding information may be expressed with a tag of the CE-HTML.

Furthermore, the UI component or the session information may be transmitted only if the external RUIC 810 can process the UI component. As shown in FIG. 8, the UI component transmitting unit 830 includes a changing unit 831 and a transmitting unit 832.

The changing unit 831 changes the UI component into a UI component having a format optimized for an external RUIC 840 with reference to a device description of the external RUIC 840. That is, a size and a layout of the UI component are optimally changed. Furthermore, as describe above, the resource path may be changed from the relative path to the absolute path.

The transmitting unit 832 transmits the UI component of which the format is changed by the changing unit 831 to the external RUIC 840.

The embodiments of the present invention can be written as computer programs and can be implemented in general-use digital computers that execute the programs using a computer readable recording medium include magnetic storage media (e.g., ROM, floppy disks, hard disks, etc.), and optical recording media (e.g., CD-ROMs, or DVDs). In another exemplary embodiment, the computer readable recording medium may include storage media such as carrier waves (e.g., transmission through the internet).

According to the present invention, the user can use contents of the RUIS with a new RUIC while maintaining a session state between the RUIS and the existing RUIC. Since the UI components, prohibited from being forwarded by the RUIS, are not forwarded to the new RUIC, the contents policy, which corresponds with the business needs of contents providers, can be ensured.

In addition, according to the present invention, since a proxy apparatus can change the UI component according to a device capability of a new RUIC apparatus, the user can use the UI component optimized for the new RUIC apparatus.

While the present invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of communicating for a client in session with an external server, the method comprising:
    determining whether a user interface (UI) component received from the external server is forwarded;
    searching for an external client, wherein the external client communicates with an interface server embedded within the client device;
    performing a capability matching with the external client by exchanging information about a capability between the embedded interface server and the external client;
    determining whether the external client can process the UI component based on the capability matching;
    changing the UI component into a format for the external client based on the capability of the external client if the UI component is determined to be forwardable according to information included in the UI component; and
    transmitting the changed UI component or session information of the changed UI component received from the external server, from the embedded interface server to the external client.

2. The method of claim 1,
    wherein the searching is performed in accordance with a Customer Electronics Association 2014 Standard (CEA-2014), and
    wherein the changing comprises:
    changing the UI component into a format for the external client, with reference to a universal plug and play (UPnP) device description of the external client in which the external client is embedded.

3. The method according to claim 1,
    wherein the searching is performed in accordance with a Customer Electronics Association 2014 Standard (CEA-2014), and
    wherein, in the transmitting, the changed UI component or the session information is transmitted only if the external client is determined to be able to process the changed UI component according to a universal plug and play (UPnP) device description of the external client in which the external client is embedded.

4. The method according to claim 1, wherein the UI component is described using a CE-HTML, and the information is expressed with a tag of the CE-HTML.

5. A non-transitory computer readable medium having embodied thereon a computer program for the method according to claim 1.

6. A client apparatus embodied on a computer with a processor and a memory, the client apparatus comprising:
    a searching unit which is configured to search for an external client, wherein the external client communicates with an interface server embedded within the client apparatus; and
    a user interface (UI) component transmitting unit which is configured to determine whether the UI component received from the external server is forwarded, to perform a capability matching with the external client between the embedded interface server and the external client, to determine whether the external client can process the UI component based on the capability matching, to change UI component into a format for the external client based on the capability of the external client if the UI component is determined to be forwardable according to information included in the UI component and to transmit the changed UI component or session information of the changed UI component received from the external server from the embedded interface server to the external client.

7. The client apparatus of claim 6,
    wherein the searching unit is configured to search for the external client in accordance with a Customer Electronics Association 2014 standard (CEA-2014), and
    wherein the UI component transmitting unit comprises:
    a changing unit which is configured to change the UI component into a format for the external client, with reference to a universal plug and play (UPnP) device description of the external client device in which the external client is embedded.

8. The client apparatus of claim 6,
    wherein the searching unit is configured to search for the external client in accordance with a Customer Electronics Association 2014 standard (CEA-2014), and
    wherein the UI component transmitting unit is configured to transmit the changed UI component or the session information only if the external client is determined to be able to process the changed UI component according to a universal plug and play (UPnP) device description of the external client device in which the external client is embedded.

9. The client apparatus according to claim 6, wherein the UI component is described using a CE-HTML, and the information is expressed with a tag of the CE-HTML.

10. A method for a server to communicate with a client, the method comprising:
    inserting information in a user interface (UI) component indicating whether or not the UI component is forwardable from the client to an external client; and
    transmitting the UI component with the inserted information from the server to the client if the UI component is determined to be forwardable according to information included in the UI component,
    wherein the transmitted UI component or session information of the transmitted UI component is changed by the client based on the capability exchanged between the client and the external client if the transmitted UI component is determined to be forwardable according to information included in the transmitted UI component and the transmitted UI component is processed by the external client based on the capability exchanged between the client and the external client.

11. The method of claim 10, wherein the UI component is described using a CE-HTML, and the information is expressed with a tag of the CE-HTML.

12. A non-transitory computer readable medium having embodied thereon a computer program for the method according to claim 10.

13. A server apparatus to communicate with a client, the server apparatus comprising:

an inserting unit which is configured to insert information in a user interface (UI) component indicating whether or not the UI component is forwardable from the client to an external client; and a transmitting unit which is configured to transmit the UI component with the inserted information from the RUIS to the client if the UI component is determined to be forwardable according to information included in the UI component, wherein the transmitted UI component or session information of the transmitted UI component is changed by the client based on the capability exchanged between the client and the external client if the transmitted UI component is determined to be forwardable according to information included in the transmitted UI component and the transmitted UI component is processed by the external client based on the capability exchanged between the client and the external client.

14. The server apparatus of claim 10 wherein the UI component is described using a CE-HTML, and the information is expressed with a tag of the CE-HTML.

* * * * *